United States Patent [19]

Drostholm et al.

[11] 4,081,302
[45] Mar. 28, 1978

[54] METHOD FOR MAKING TUBULAR RESIN ELEMENTS SUCH AS PIPES

[75] Inventors: Frede Hilmar Drostholm, Vedbaek, Denmark; Leonard S. Meyer, Columbia, S.C.

[73] Assignee: Frede Hilmar Drostholm, Vedbaek, Denmark

[21] Appl. No.: 698,298

[22] Filed: Jun. 21, 1976

Related U.S. Application Data

[63] Continuation of Ser. No. 236,892, Mar. 22, 1972, Pat. No. 4,011,354.

[51] Int. Cl.² .......................................... B65H 81/00
[52] U.S. Cl. ................................. 156/190; 138/143;
 138/144; 156/192; 156/195; 156/429; 156/432
[58] Field of Search .............. 156/3, 153, 173, 188,
 156/190, 192, 195, 429, 431, 432; 138/141, 143,
 144, 147, 150, 154; 427/44, 309

[56] References Cited

U.S. PATENT DOCUMENTS

| 1,954,403 | 4/1934 | Daly | 156/3 |
|---|---|---|---|
| 2,225,026 | 12/1940 | Welsh | 156/195 |
| 2,663,663 | 12/1953 | Weltman et al. | 156/3 |
| 2,690,769 | 10/1954 | Brown | 156/306 |
| 2,723,705 | 11/1955 | Collins | 138/144 |
| 2,739,881 | 3/1956 | Kepple | 156/3 |
| 2,815,043 | 12/1957 | Kleiner et al. | 138/144 |
| 2,925,831 | 2/1960 | Welty et al. | 138/141 |
| 2,929,744 | 3/1960 | Mathes et al. | 427/44 |
| 2,944,917 | 7/1960 | Cahne | 156/3 |
| 3,068,133 | 12/1962 | Cilker et al. | 156/428 |
| 3,390,704 | 7/1968 | Woodell | 138/143 |
| 3,464,879 | 9/1969 | Poulsen | 156/429 |
| 3,466,207 | 9/1969 | Vincent et al. | 156/3 |
| 3,487,149 | 12/1969 | Bunish et al. | 156/276 |
| 3,623,930 | 11/1971 | Grosh | 156/189 |
| 3,679,508 | 7/1972 | Weidel | 156/184 |
| 3,679,531 | 7/1972 | Wienand et al. | 138/150 |
| 3,886,029 | 5/1975 | Poulsen | 156/188 |
| 3,979,250 | 9/1976 | Drostholm | 156/195 |

Primary Examiner—William A. Powell
Attorney, Agent, or Firm—Synnestvedt & Lechner

[57] ABSTRACT

There is disclosed a method and apparatus for making tubular fiber reinforced thermosetting resin elements having a thermoplastic lining. The technique involves application of a thermoplastic lining layer to an axially moving mandrel surface, application of at least one layer of fiber reinforced thermosetting resin material superimposed upon the lining layer, providing for bonding of thermosetting and thermoplastic layers to each other, and heating the thermosetting resin to effect solidification during axial advancement of the superimposed layers with the moving mandrel surface. Provision is also made for applying a thermoplastic jacket layer superimposed upon the thermosetting layer.

14 Claims, 20 Drawing Figures

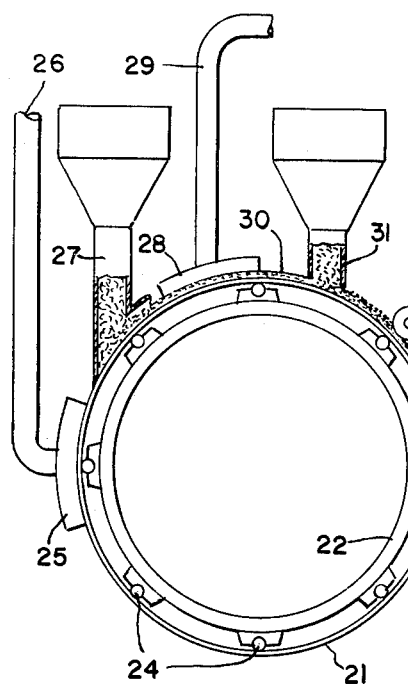
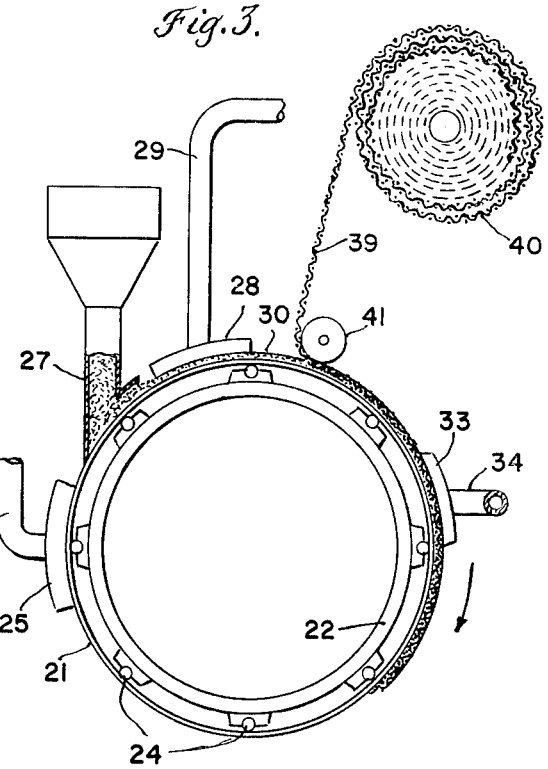
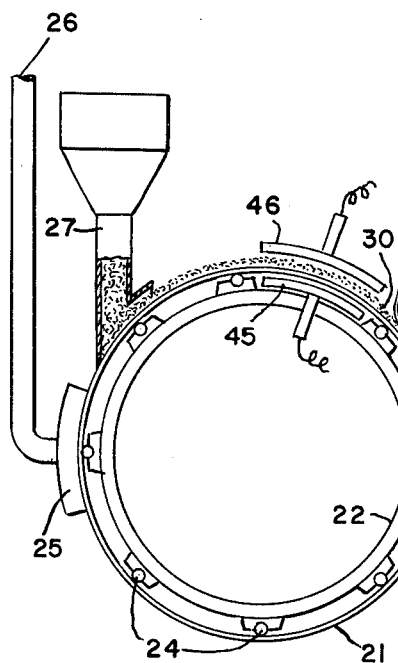
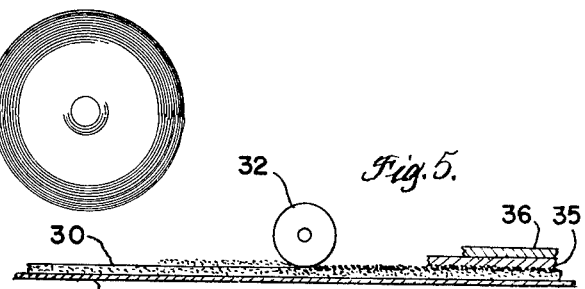
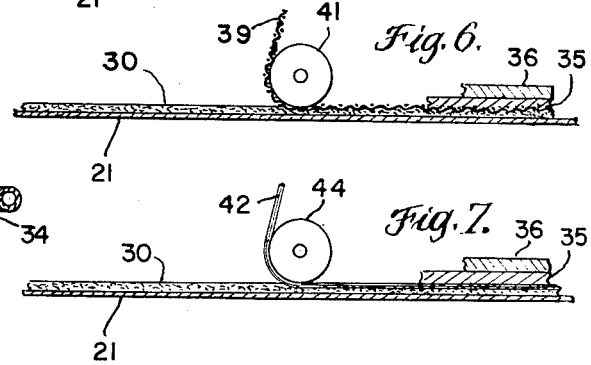
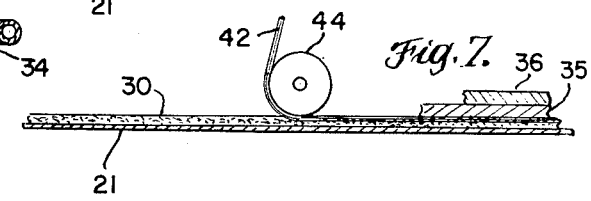

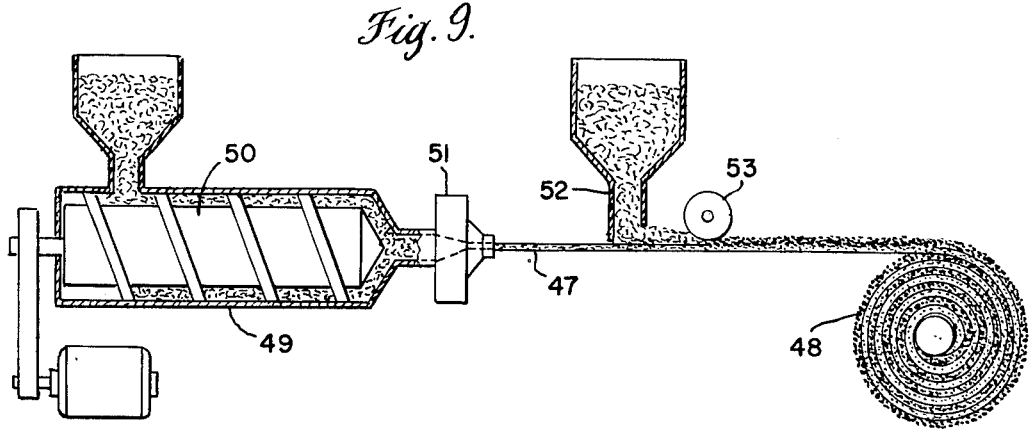
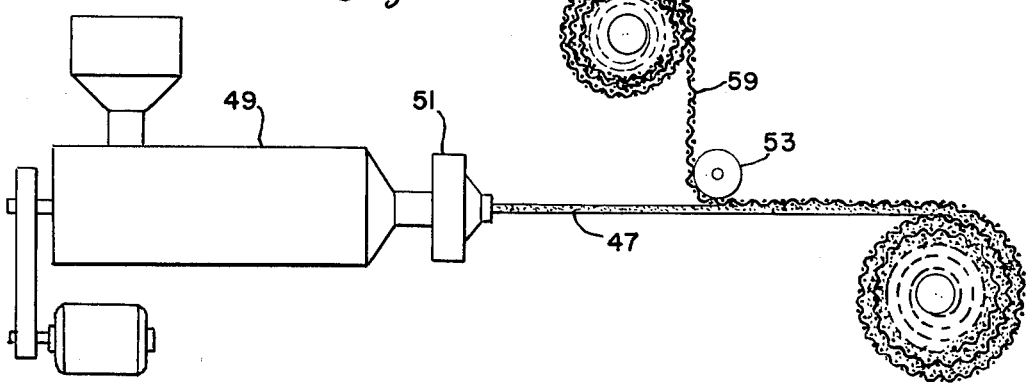
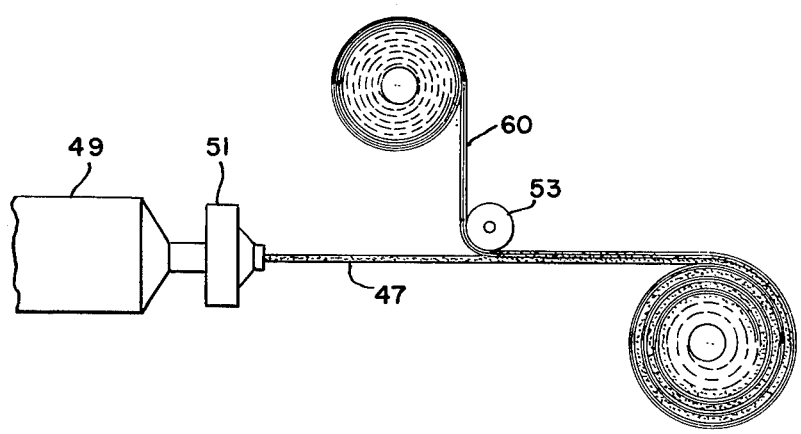

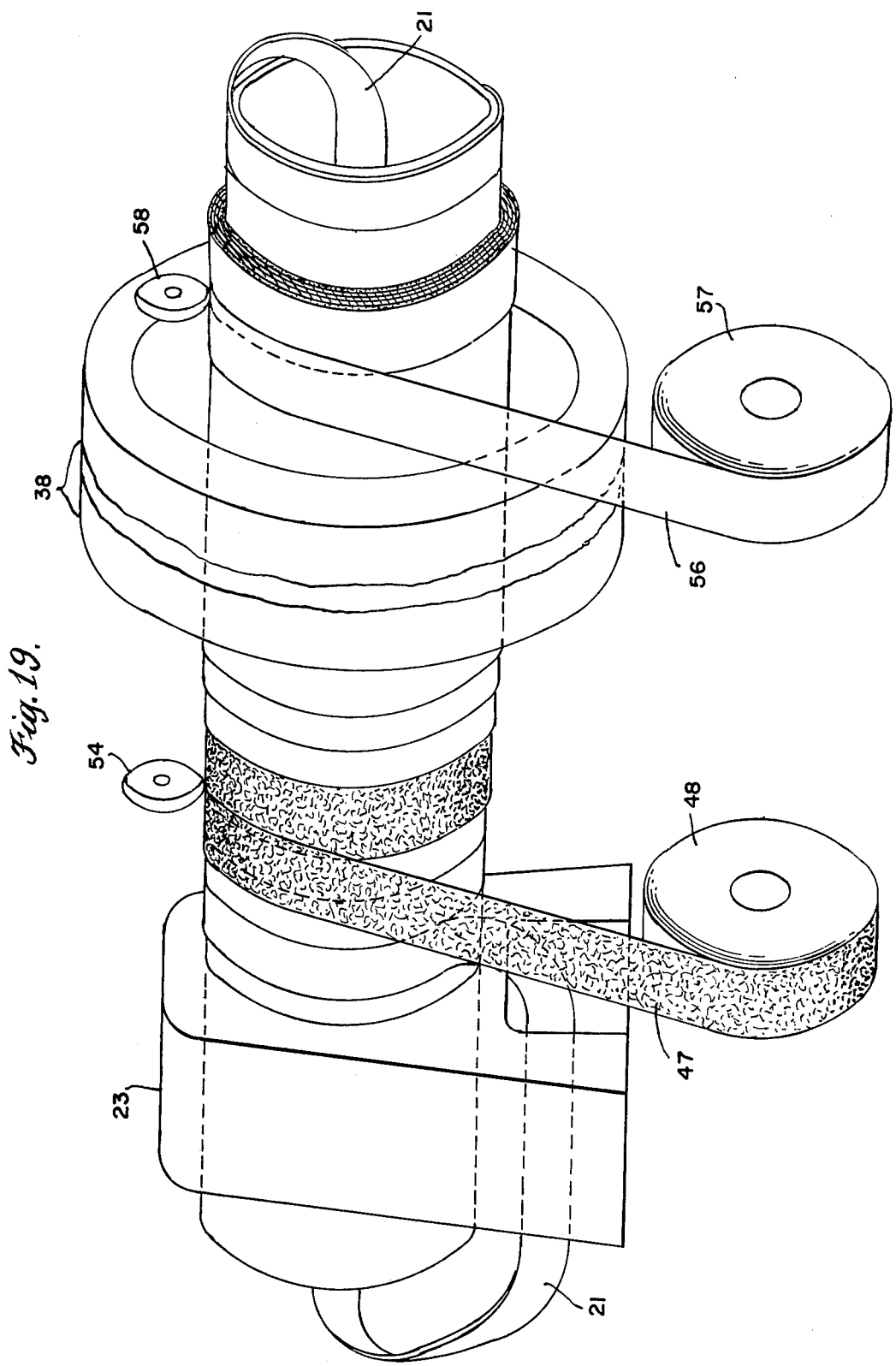

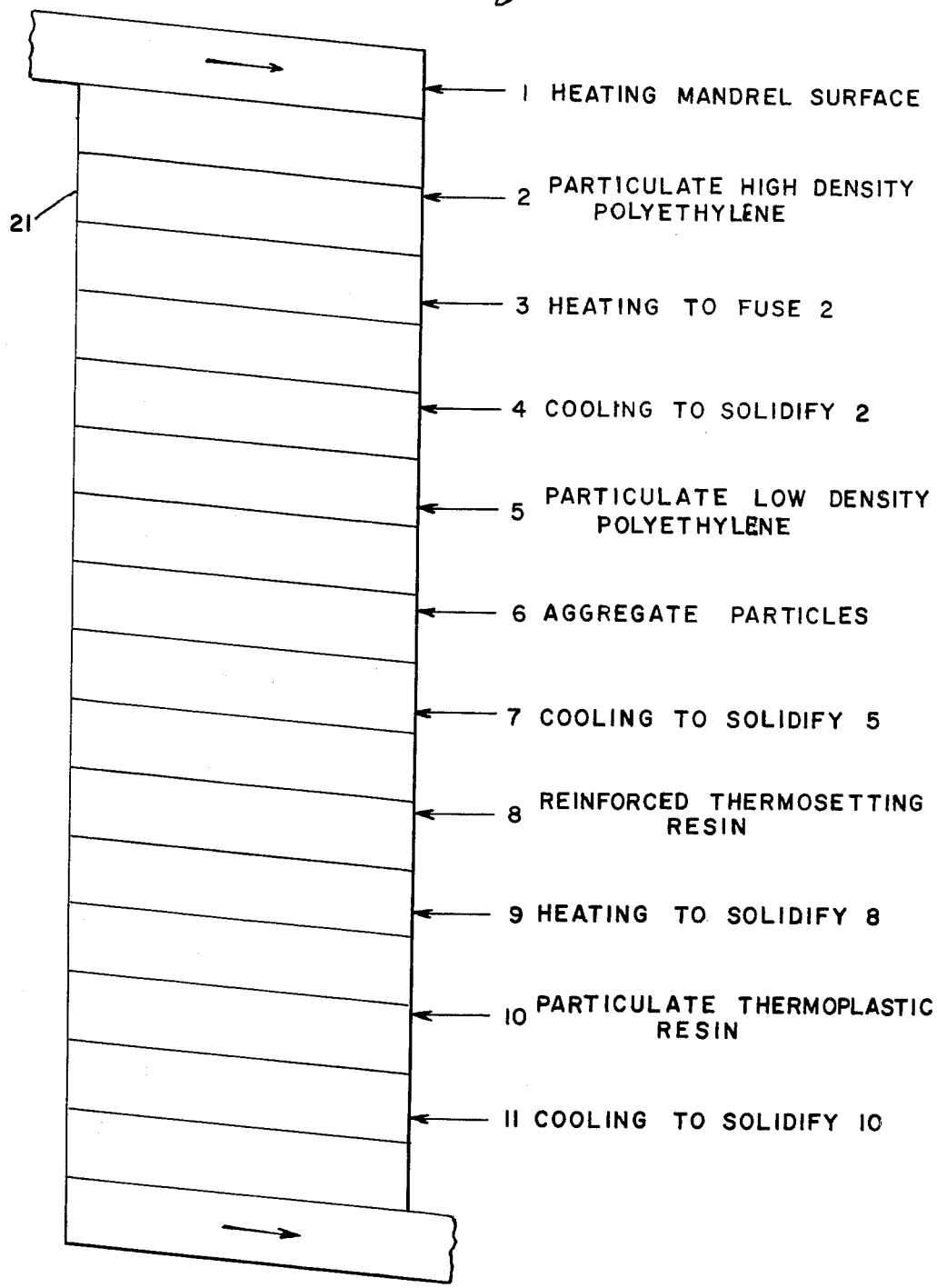

METHOD FOR MAKING TUBULAR RESIN ELEMENTS SUCH AS PIPES

This is a continuation of application Ser. No. 236,892, filed Mar. 22, 1972, now U.S. Pat. No. 4,011,354.

BACKGROUND AND STATEMENT OF OBJECTS AND ADVANTAGES

This invention relates to the production of tubular elements such as pipes or tanks, especially such tubular elements as are formed of fiber reinforced thermosetting resin materials and which are provided with a lining particularly in the form of a thermoplastic resin lining.

As is known, fiber reinforced thermosetting resin materials are well suited to the manufacture of tubular elements from the standpoint of structural strength, but as is also well known, the fiber reinforced thermosetting resin materials have a characteristic tendency to "weep" or leak through the wall structure, particularly where a substantial pressure differential exists as between the inside and the outside of the pipe or tank. This weeping or porosity is so severe in some cases as to preclude use of the pipes or tank for many purposes for which the fiber reinforced thermosetting resin is otherwise well adapted.

In view of this tendency to weep, it has been proposed to apply an impervious lining to tubular fiber reinforced thermosetting resin elements and this has been done by a variety of techniques in which the lining is made of thermoplastic resin material. However the techniques heretofore employed for this purpose are subject to one or more of a number of disadvantages. Generally these disadvantages fall into several categories, including processing difficulties, excessive production costs, and incompatibility of the thermoplastic resin with the thermosetting resin so that the lining is not effectively bonded to the body of the tubular element.

More specifically the prior techniques include the following:

In some cases after completion of an unlined tubular thermosetting resin element a lining has been applied to individual pieces of the tubing by centrifugal or tumbling coating operations. Techniques of this kind are disadvantageous because of excessive production costs resulting from the piece-by-piece handling required. In addition, this type of internal coating does not ordinarily provide a secure bond between the thermoplastic lining and the thermosetting resin of the body of the tubular element.

In another known technique for applying a lining, the lining was first preformed, as by extrusion or molding and the preformed lining tube was then placed in a filament winding machine in which the fiber reinforced resin laminate was applied in superimposed layers. This prior technique also has the major disadvantage of excessive and expensive piece-by-piece handling and also the disadvantage that an effective bond between the thermoplastic and thermosetting resins is not provided.

Some attempts have also been made to apply a lining layer upon a mandrel, for instance by helically winding a strip of thermoplastic resin material, winding the fiber reinforced thermosetting resin on top of the lining layer and advancing the tubular structure being built in this way axially along the external surface of the mandrel, i.e., by sliding the lining layer on the surface of the mandrel. This technique is subject to various processing difficulties, including the fact that sliding motion of the lining on the mandrel has a tendency to disrupt the integrity of the lining especially if the thermosetting resin laminate is heated to effect curing thereof while it is on the mandrel, such heating naturally tending to soften the thermoplastic resin of the lining layer.

In contrast to all of the foregoing, the present invention provides a distinctive technique in which the thermoplastic lining layer is first applied to an axially moving mandrel surface, the thermosetting resin laminate is built upon the lining layer, and the axial motion of the mandrel surface carries all layers of both the lining and the body of the tubular element in an axial direction without any sliding motion of the lining layer on the mandrel. By operating in this way, continuous and high speed production is readily attainable, and the piece-by-piece handling of finite lengths of the tubular element is eliminated.

The invention further contemplates special provision for the bonding of the thermoplastic lining layer to the thermosetting resin of the fiber reinforced laminate superimposed upon the lining layer, thereby overcoming the difficulties heretofore encountered because of lack of effective bonding between the layers, such as the tendency for the lining to break away from the laminate and disintegrate within the tubular element.

Still further the invention contemplates employment of a sequence of operations according to which the lining layer may readily be formed in situ on the axially moving surface of the mandrel. In this way bulk material for formation of the thermoplastic lining may continuously be fed to the mandrel and the lining may be progressively fused from the applied bulk material in advance of the zone of application of the fiber reinforced thermosetting laminate. Continuous application of a bonding means is also provided for in advance of the zone where the laminate is applied and in this way an overall production system is provided requiring a minimum of attendance.

In accordance with another aspect of the invention, provision is made for continuously applying an impervious, preferably a thermoplastic, jacket layer superimposed upon the fiber reinforced thermosetting laminate, this jacket layer also being applied while the lining layer and the laminate are carried by and are being advanced with the axially moving surface of the mandrel. Provision is also made for effecting secure bonding of the jacket layer to the thermosetting resin laminate notwithstanding the use of impervious thermoplastic material for the jacket layer.

How the foregoing and other objects and advantages are attained will appear more fully from the following description referring to the accompanying drawings in which:

BRIEF DESCRIPTION OF THE FIGURES

FIG. 2 is a transverse sectional view through the mandrel shown in FIG. 1 and through portions of the equipment associated therewith for applying a thermoplastic lining layer to the mandrel and also illustrating equipment for applying a bonding medium in a position at the interface between the thermoplastic lining layer and the superimposed thermosetting laminate;

FIGS. 3 and 4 are views similar to FIG. 2, but illustrating alternative arrangements for introducing a bonding means at the interface between the lining layer and the thermosetting laminate;

FIGS. 5, 6 and 7 are enlarged fragmentary and diagrammatic views illustrating certain features of the arrangements 2, 3 and 4, respectively, for introducing a bonding means at the interface between the thermoplastic lining layer and the superimposed thermosetting laminate;

FIGS. 9, 10 and 11 are somewhat diagrammatic views illustrating the preparation of a thermoplastic tape or strip to be employed in building up the lining layer and the jacket layer in a system as illustrated in FIG. 8;

FIG. 19 is a view similar to FIG. 8, but showing an alternative system for applying a jacketing layer superimposed upon the thermosetting laminate; and FIG. 20 is a diagram illustrating another and specific embodiment of the invention providing for application of both a lining layer inside of and a jacketing layer outside of the thermosetting laminate.

DETAILED DESCRIPTION OF THE TECHNIQUE OF THE INVENTION

Figure 1:
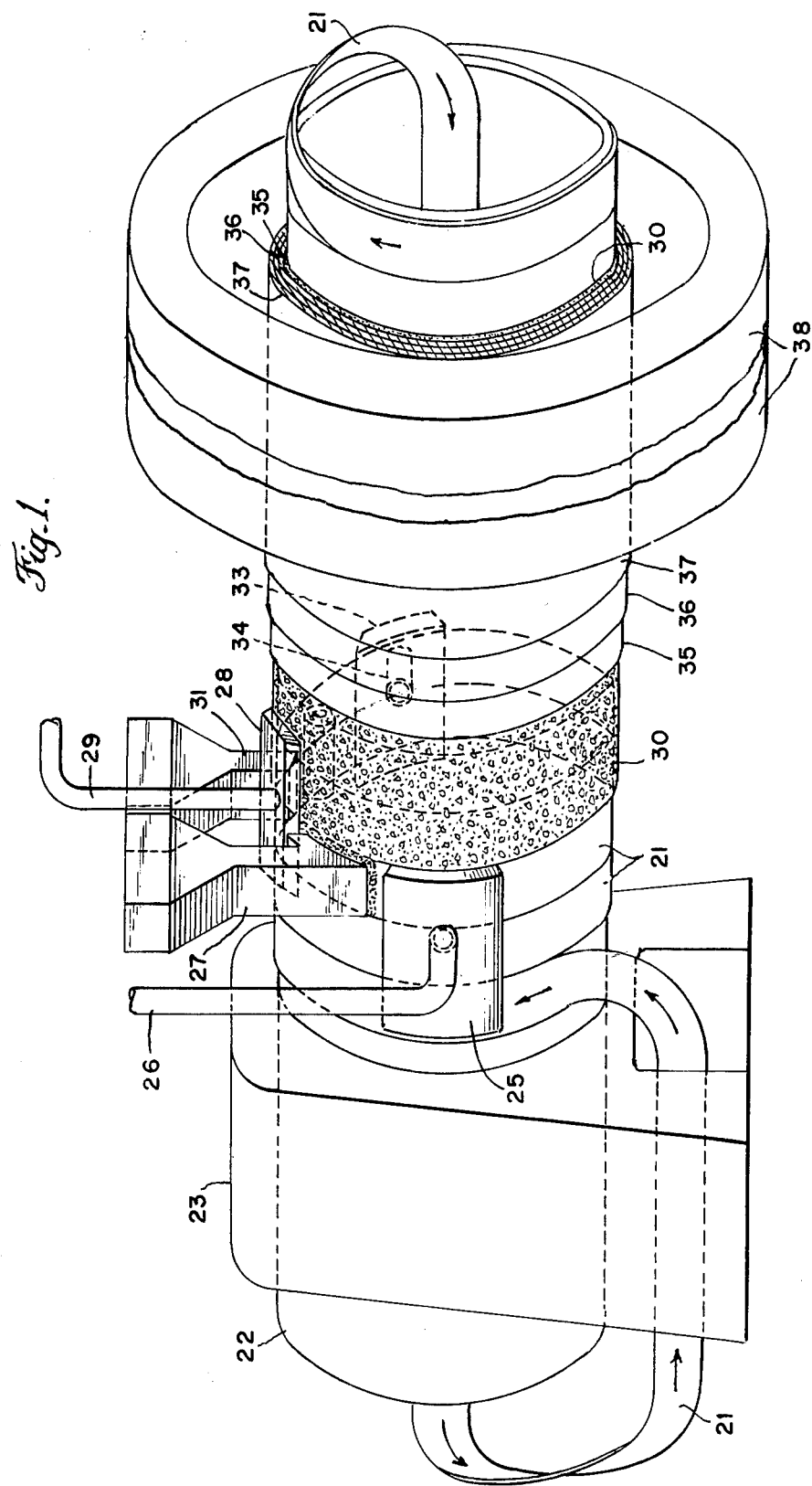
FIG. 1 is an isometric outline view of one embodiment of the equipment preferably employed in the practice of the invention, this view showing a mandrel having an axially moving surface and further showing the application of a thermoplastic resin lining to the moving surface of the mandrel, and still further illustrating the thermosetting laminate superimposed upon the lining.

Referring first to the embodiment illustrated in FIGS. 1 and 2, attention is first directed to the general arrangement and construction of the mandrel, including the means providing an axially movable mandrel surface. The structural arrangement providing the movable mandrel surface is illustrated in FIGS. 1 and 2 (and also in certain other Figures hereinafter described) only in outline and somewhat diagrammatically, because the details of construction of the mandrel form no part of the present invention per se, being more fully disclosed in U.S. Pat. No. 3,464,879 issued Sept. 2, 1969, to P. U. Poulsen to which reference is made.

Generally described, the moving surface of the mandrel is made up of a plurality of edge to edge turns of a metal strip or band 21 which is fed in a helical path on an internally hollow supporting structure. The metal strip or band comprises a closed loop and is guided away from the helical path on the supporting structure at one end thereof (the right hand end as viewed in FIG. 1) and the band is then fed as indicated by the arrow into and through the hollow interior of the supporting structure for delivery out of the opposite end of the supporting structure and for return into the left hand end of the feed path, as is also indicated in FIG. 1 by the direction arrows. Appropriate guide and driving devices for the metal band are provided, but these are not illustrated herein as they form no part of the present invention per se.

The support for the metal band may comprise an internal support structure such as indicated diagrammatically in outline at 22 in FIGS. 1 and 2, and which may be mounted in cantilever by the standard 23, this supporting structure being provided with a multiplicity of ball or roller supports 24 (see FIG. 2) on which the turns of the band 21 may freely move in the helical path of the band. Various anti-friction systems for supporting the band 21 may be employed for instance in accordance with the disclosure of the Poulsen patent above identified and also in accordance with the disclosure of co-pending U.S.A. application of Frede Hilmar Drostholm, Ser. No. 171,921, filed Aug. 16, 1971, now U.S. Pat. No. 3,979,250.

The band 21 moves on the support structure 22 in a helical path, so that the surface of the mandrel actually moves axially thereof as well as rotationally and this motion of the mandrel surface is utilized in a unique way, having special advantages in the production of tubular elements especially such tubular elements as are made up of a thermosetting laminate interiorly lined with a thermoplastic resin lining layer.

In accordance with the embodiment illustrated in FIGS. 1 and 2, the metal band 21 is preheated toward the left end of the helical path of the band on the mandrel and for this purpose a hot air hood 25 of arcuate shape is positioned close to the mandrel at one side thereof, hot air being supplied to this hood by means of the duct 26. The direction of rotation of the turns of the metal band is indicated in FIG. 2 by the arrows and in view of this direction of rotation, the surface of the mandrel moves upwardly from the hood 25. In a position just above the hood a feed chute 27 is provided for particulate thermoplastic resin material, for instance, polyethylene, these particles being deposited upon the preheated surface and thereby being heated to initiate fusion. An additional hot air hood 28 is arranged beyond the feed chute 27 with respect to the direction of rotation, the hood being supplied with hot air from the duct 29, this additional hot air serving the insure complete fusion of the particles of the resin material in order to form the desired lining layer 30.

Beyond the hood 28 there is arranged another chute 31 providing for delivery to the surface of the fused and still soft lining layer of aggregate particles, for instance jagged and porous particles of crushed stone, coke, foamed glass or the like. These particles will adhere to the fused lining layer which is soft at that point and are partially pressed and embedded into the surface of the lining layer, for instance, by the roller indicated at 32. This action is illustrated in greater detail in the diagrammatic view of FIG. 5 in which the surface of the mandrel is shown flat instead of curved. Following the pressure roller 32, still another air hood 33 is provided, being fed by the duct 34. This hood and duct serve to deliver cooling air and thereby effect solidification of the aggregate-bearing thermoplastic lining layer. The aggregate-bearing lining layer 30 is plainly shown in the mid-region of FIG. 1.

The next operation performed in accordance with the system of FIGS. 1, 2 and 5 is the application of the fiber reinforced thermosetting laminate. Three layers of this laminate are indicated in FIG. 1 at 35, 36 and 37, two of the layers also appearing at 35 and 36 toward the right in FIG. 5. In FIG. 5 the cooling hood 33 which intervenes between the pressure roller 32 and the application of the laminate layers is not illustrated and while it is preferred to use such cooling means, it is also possible that with certain thermoplastic resin formulations the cooling means at this point may not be needed. The equipment for applying the thermosetting laminate is not illustrated in the drawings because such equipment forms no part of the present invention per se. Equipment for this purpose comprises feed mechanism for fibrous reinforcements which may take one or more of a number of different forms, for instance rovings, mats, fabrics, or loose strands such as chopped strands. Although various of these reinforcements may be made of a variety of materials, preferably they are mineral and most desirably are formed of glass. The reinforcements are delivered to the surface of the article being made along with the thermosetting resin material, advantageously in liquid form, for instance liquid, uncured polyester resin material. The feed of these fibrous reinforcements may be accomplished by means of the kind of equipment employed in well known filament winding operations or the fibrous reinforcements may be applied by means of equipment such as disclosed in the co-pending U.S.A. application of Ulrik Poulsen, Ser. No. 96,361, filed Dec. 9, 1970, now abandoned.

In any event, regardless of the manner of feed of the impregnated reinforcements, it is ordinarily preferable to build up a multi-layer laminate with the reinforcement fibers in various layers oriented in different ways in order to provide both longitudinal and hoop strength.

After the application of the successive layers of the laminate, the entire structure including both the inside lining and the laminate is advanced as a result of being carried by the axially moving surface of the mandrel and into and through a controlled temperature zone, for instance a curing oven such as indicated in outline at 38. This oven may be of any desired length, the central portion thereof being broken out in FIG. 1. Interiorly of the oven heating means are provided, for instance in the form of heating lamps so that the thermosetting laminate is heated and cured while the entire tubular structure is being advanced on the axially moving surface of the mandrel.

Although the heating to cure and solidify the thermosetting laminate may also result in resoftening the thermoplastic lining layer, this is not of consequence because the thermoplastic lining layer is enclosed within the thermosetting laminate and it is retained intact and in proper position as the lining of the tubular element is being made. Moreover, since this lining layer is being carried by the moving surface of the mandrel, there is no tendency to disrupt the lining as in the case of a lining which is expected to be moved along a mandrel by a sliding motion on the surface of a mandrel which does not move axially.

Since the thermosetting laminate is applied on top of the aggregate-bearing lining layer with the thermosetting resin in liquid condition, the thermosetting resin material surrounds and penetrates pores of the particles of the aggregate and, upon the curing and solidification of the thermosetting resin material, an effective bond is provided between the laminate and the lining.

If desired the built up tubular structure may be cooled prior to delivery from the mandrel.

Although it is preferred to provide some bonding means at the interface between the laminate and the lining layer, this may not always be necessary and it is contemplated according to the present invention that the supply of aggregate may be eliminated from a system such as shown in FIGS. 1 and 2. Similarly it may not always be necessary to employ both the preheating hood 25 and the postheating hood 28 for fusing the particulate resin material applied to form the lining layer.

In a system such as described above, with reference to FIGS. 1, 2 and 5, or described below with reference to other figures, it should also be noted that if desired a film of some parting material, for instance cellophane, or a coating of some parting compound may be applied at the interface between the moving surface of the mandrel and the thermoplastic resin forming the lining layer for the tubular element being made.

Bonding systems other than that described with reference to FIGS. 1, 2 and 5 alternatively be used. For example, as shown in FIG. 3, instead of using aggregate particles, fibrous elements may be employed and these may take a variety of forms, such as glass rivets, rovings, chopped strands or fabrics. For instance a glass fiber mat or a glass fabric strip such as indicated at 39 in FIG. 3 may be fed from a supply roll 40 under a pressure roll 41 serving to partially embed the fabric in the outer surface of the lining layer 30 while it is softened. This alternative is illustrated also in FIG. 6 from which it will also be understood that upon the application of the thermosetting laminate layers, the thermosetting resin of the laminate will become bonded to the projecting portions of the fibrous strip 39 and thus provide an effective bond at the interface between the lining layer and the thermosetting laminate.

The arrangement shown in FIGS. 4 and 7 may also be employed as an alternate means providing a bond at the interface between the lining layer and the laminate. Here a group of rovings 42 delivered from a supply 43 may be fed to the surface of the softened lining layer by means of the pressure roll 44, and when the thermosetting laminate layers are applied, a bond will again be provided.

FIG. 4 further illustrates an alternative heating system for fusing the particulate thermoplastic resin material supplied through the chute 27. In accordance with this embodiment, electrodes 45 and 46 may be provided inside and outside of the sandwich made up of the band 21 and the thermoplastic layer. Such electrodes may comprise elements of a radio frequency heating system, the heat here applied insuring complete fusing of the resin particles and formation of the desired impervious thermoplastic layer.

Still other systems for introducing a bond at the interface of the thermoplastic lining layer and the thermosetting laminate may be employed. For example, an adhesive bond may be introduced, as by coating the formed and solidified lining layer with a material manifesting adhesive properties with respect to both layers. Examples of such an adhesive are epoxy and polyurethane.

A "solvent" bond may also be obtained by taking advantage of the natural solvent characteristics of the liquid thermosetting resin material, for instance polyester material prior to its curing and solidification. This type of bond is provided, for example, by using a polystyrene as the thermoplastic resin material for the liner and using a styrene monomer polyester for the thermosetting resin of the laminate. In this way good adhesion and bonding can be secured without the separate introduction of another coating or another bonding structure.

Chemical bonding may also be utilized, for example, by taking advantage of the reaction and consequent adhesion which may occur between similar materials used in the lining layer and in the laminate. An example is the use of an acrylic liner, for instance polymethyl-methacrylate and the use of an acrylic modified polyester for the laminate. In another example an unsaturated polyester would be used in the laminate and a saturated thermoplastic polyester in the lining.

Figure 8:
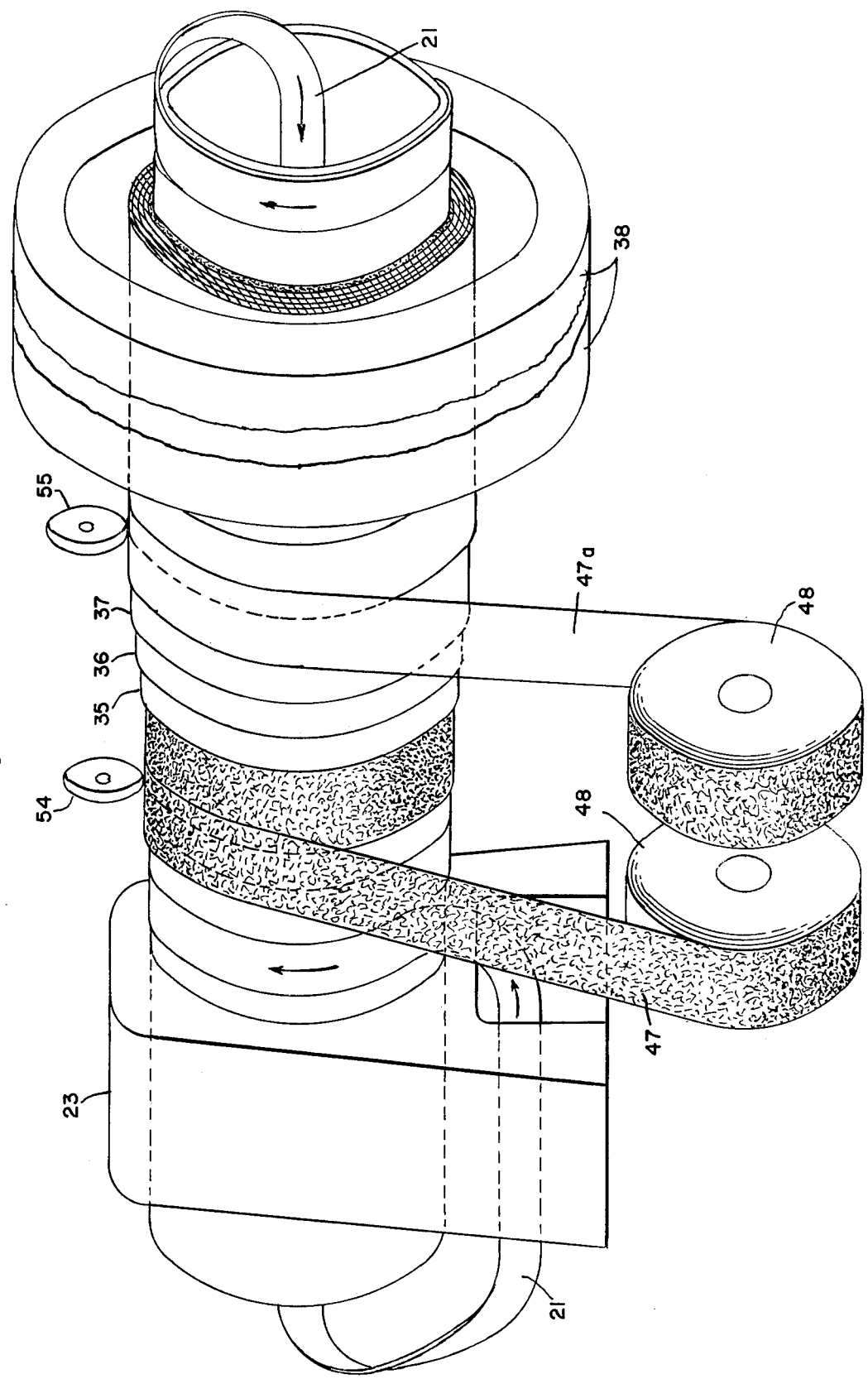
FIG. 8 is a view similar to FIG. 1, but illustrating a modified arrangement for applying the thermoplastic lining layer and the bonding medium at the interface between the lining layer and the superimposed laminate, and further illustrating the application of a jacketing layer to the thermosetting laminate.

In the embodiments illustrated in FIGS. 1 to 7 the lining layer is formed by fusion of particulate resin material in situ on the moving mandrel surface. The lining layer may, however, be developed in another manner, i.e., by the use of preformed thermoplastic tape or strip material which is wound upon the moving mandrel surface in a helical path with the adjacent edges of the helical turns sealed to each other in order to develop the desired impervious lining. An example of such a system is illustrated in FIG. 8. Here again the mandrel is formed by a band 21 fed in a helical path upon the supporting structure just as in the first embodiments, but instead of forming the lining from particulate resin material fused in situ, the lining is formed by helically winding a preformed thermoplastic tape strip 47 fed from a supply roll 48. A strip suitable for this purpose may be preformed, for instance, in the manner illustrated in FIG. 9 in which the particulate resin material is fed into a heated extruder barrel 49 and is advanced by means of the screw 50 for delivery through a nozzle 51 in the form of the strip 47. Aggregate particles are delivered to one side of the strip 47 by the feed mechanism 52, these particles being partially embedded into the surface of the strip by means of a pressure roll indicated at 53, the resultant product being wound up at 48 to constitute the supply roll shown in FIG. 8.

From FIGS. 8 and 9 it will be observed that the aggregate particles are deposited on the outside of the turns of the roll 48 and from FIG. 8 it will be seen that the winding of this strip upon the mandrel is arranged to present the aggregate particles outwardly, so that they may serve the function of bonding the lining layer with the subsequently applied thermosetting laminate.

Figure 12:
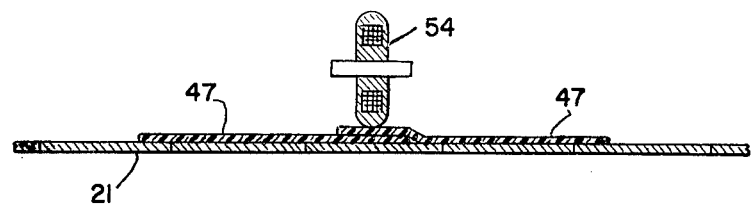
FIG. 12 is an enlarged, fragmentary, detailed view of the arrangement used in FIG. 8 for the purpose of joining adjacent edges of the thermoplastic tape employed to build up the lining and jacket layers in the system of FIG. 8.

As seen in FIG. 8, the turns of the strip 47 applied to the mandrel are slightly overlapped at their adjacent edges, and a heated sealing wheel 54 (see also FIG. 12) is arranged to engage the lapped edges of the turns of the strip 47, in order to seal those edges to each other and thereby join the turns into a continuous or uninterrupted lining for the tubular element being made. Following application of this lining layer the thermosetting laminate may then be applied as represented by the layers 35, 36 and 37 above described and also shown in FIG. 8.

In the embodiment of FIG. 8 provision is made for applying a jacketing layer of thermoplastic resin material, and for this purpose a preformed strip 47a of exactly the same construction as described above may be employed, the strip being fed from the supply roll 48. In this case, however, the strip is fed from a supply roll in a position so that the aggregate particles are presented inwardly rather than outwardly. With the strip 47a applied for jacketing in the manner just described and in the position indicated at FIG. 8, this strip will be wound upon the stillsoft or wet thermosetting resin material of the laminate, in view of which upon curing of the thermosetting resin, the jacket layer will also be bonded to the laminate, just as in the case of the lining layer. The turns of the jacketing strip 47a are desirably overlapped and sealed to each other by a heated sealing wheel 55.

After application of the jacket layer, the entire composite structure of the tubular element being made is advanced into and through the curing oven 38 for purposes already described. If desired in this embodiment as well as in the embodiment of FIG. 1, cooling may be applied to the tubular element being made after leaving the oven but prior to its ultimate delivery from the mandrel.

The application of a jacketing layer in the manner just described in also applicable to any of the systems described above with reference to FIGS. 1 to 7 inclusive.

An alternative arrangement for applying a jacketing layer is illustrated in FIG. 19. Here the application of the lining layer is effected in exactly the same manner as illustrated in FIG. 8, but the tape for forming the jacketing layer is not applied prior to entrance of the laminate into the oven 38 but, instead, is applied after the laminate has been cured. Thus in FIG. 19 a tape 56 is shown as being helically wound upon the laminate after leaving the curing oven 38, the tape 56 being fed from a supply roll 57 and in this instance the tape does not carry a bonding medium such as the aggregate particles referred to above in connection with FIGS. 8 and 9. Since the laminate will, at this point, be cured and solidified, the aggregate particles would not be effective to perform the bonding function. However, with the tape 56 wound under tension upon the external surface of the cured laminate, the tendency to loosen or develop discontinuity is not great. The tape 56 has turns with edges overlapped and the overlapped edges are desirably sealed by means of a heated sealing wheel 58.

In connection with various of the embodiments where lining or jacketing layers are developed by the use of preformed tape, if a bonding medium is desired, this may take the form of a fibrous web or fabric such as indicated at 59 in FIG. 10 or the form of a group of rovings as indicated at 60 in FIG. 11.

Moreover, certain other bonding techniques already described above in connection with the embodiments of FIGS. 1 to 7 may be employed where a preformed tape is used to build up either a lining layer or a jacketing layer.

Figure 13:
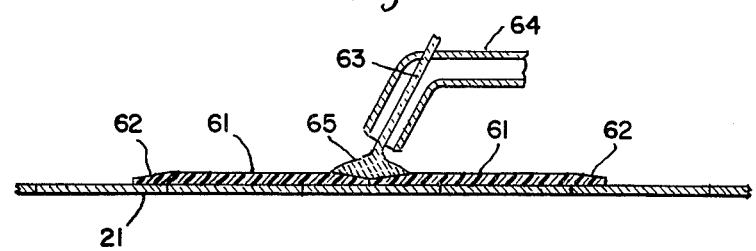
FIG. 13 is a fragmentary, detailed view similar to FIG. 12, but illustrating an alternative arrangement for joining the edge portions of adjacent turns of the tape employed for building up the lining layer.

Alternative ways of sealing the adjacent edges of the turns of preformed thermoplastic tape used for lining or jacketing may be employed including, for example, the arrangement illustrated in FIG. 13. Here the thermoplastic strip 61 is provided with beveled edges 62 at both sides, and the turns of the strip are wound upon the moving surface of the mandrel formed by the band 21 in edge-to-edge relation, rather than overlapping as in FIGS. 8, 19 and 12. The adjacent edges are then sealed by a known type of hot air welding according to which a solid rod of plastic material 63 is fed through a hot air nozzle 64 so that a bead 65 of sealing or weld material is deposited in the groove formed by the adjacent beveled edges of the turns of the strip. Other edge configurations providing a recess to receive the bead 65 may also be employed.

Figure 14:
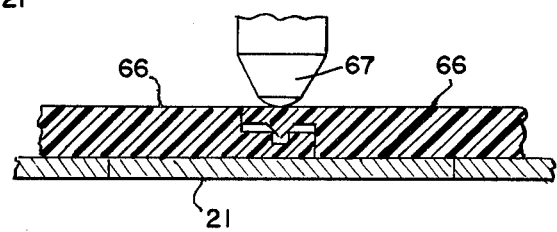
FIGS. 14, 15 and 16 are enlarged views similar to FIGS. 12 and 13, but illustrating still other alternative arrangements for joining the edge portions of adjacent turns of the tape employed for building up the lining layer.

Still another system for sealing the edges of adjacent turns of preformed thermoplastic strip is shown in FIG. 14, where it will be seen that the strip 66 is configured at its edges to provide a shiplap joint, with interengaging portions adapted for sealing by ultrasonic sound waves delivered to the joint as by the ultrasonic horn 67.

Figure 15:
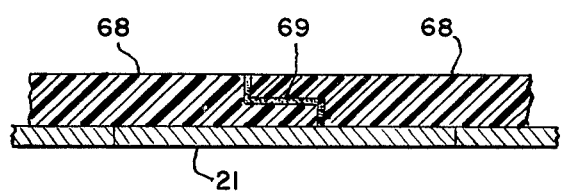

A shiplap joint provided at the edges of a strip 68 shown in FIG. 15 may also be joined by an adhesive layer such as indicated at 69, made for instance of epoxy resin. Tongue and groove or other interfitting edges can similarly be adhesively interconnected.

Figure 16:
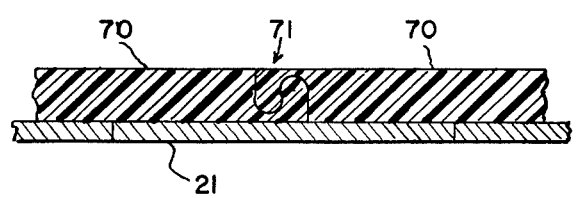

In FIG. 16 there are shown two adjacent turns of a strip 70 having mechanically interlocked edge portions indicated at 71 which may be arranged to fit with sufficient snugness to provide the desired sealing between the edges of the turns.

With respect to the embodiments in which the lining layer is built up by winding preformed thermoplastic tape upon the mandrel, it may be noted that this technique ordinarily does not require the preliminary covering of the mandrel with a thin film of plastic material, such as cellophane, which expedient may be used to advantage where the lining layer is fused in situ from particulate resin material. It can, however, be employed in any of embodiments employing preformed tape, if desired, and a parting compound may alternatively be used, and this may be of substantial benefit, for instance where the temperature in the oven 38 employed for curing of the thermosetting laminate is relatively high in relation to the softening temperature of the thermoplastic resin used for the lining.

Figure 17:
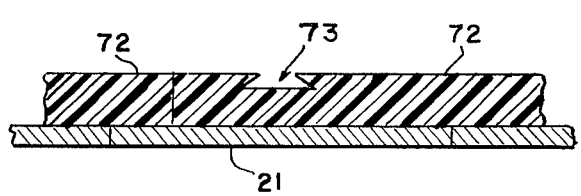
FIGS. 17 and 18 are fragmentary, sectional views of a lining layer of alternative construction providing for interlocking or keying with the thermosetting laminate resin.
Figure 18:
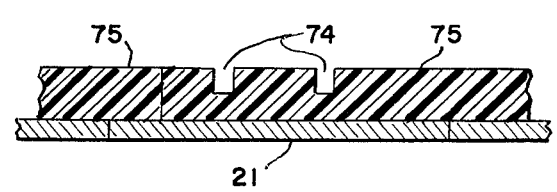

FIGS. 17 and 18 illustrate alternative arrangements for providing a bonding between the lining layer and the thermosetting laminate. In these embodiments a mechanical keying or interlocking is provided directly between the resin material of the lining layer and the resin material of the laminate. The illustration of FIG. 17 represents a preformed, for instance extruded, tape 72 having a dovetail groove 73 formed therein. When a strip of this type is wound upon the mandrel, and the liquid thermosetting laminate resin is subsequently applied, the liquid resin material will enter the dovetail groove 73 and when the thermosetting resin is cured and hardened, this provides a secure mechanical interlock directly between the lining layer and the laminate. Although the use of a dovetail groove of the kind referred to is particularly well suited to the formation of the lining layer from a preformed tape, it is also possible to provide such dovetail grooves in a lining layer made in situ on the mandrel by fusing particulate resin material, as in FIG. 1. For example, such a groove could be cut in the fused and resolidified lining layer by means of appropriately positioned cutting knives or machining elements.

The arrangement of FIG. 18 provides an alternative mechanical interlocking system in which simple straight sided grooves 74 are provided in the lining layer 75 regardless of whether these grooves are provided in a preformed tape or in a lining layer fused in situ on the mandrel.

Still other ways in which a thermoplastic resin lining may be provided inside of the tubular article being made, include the use of various calenders and also certain coating equipment. In the case of certain coating equipment the resin would of course be delivered in liquid or substantially liquid form. In calender or coating operations and also where preformed strips are applied in order to make up the lining layer, a differential in speed between the rotative movement of the mandrel and the feed of the resin material may be employed. With a higher surface speed of the mandrel then the speed of feed of the resin material, the differential in speed may advantageously be used to attenuate or reduce the thickness of the lining material being applied, thereby avoiding use of an unnecessary excess of the lining material. Similar expedients may be adopted in the application of the jacketing layer, which may also be applied not only in the winding of preformed strip material upon the mandrel, but also in calender or certain coating operations.

Still another alternative may be utilized in introducing a lining, i.e., a strip or sheet type of metal foil may be applied to the mandrel, for instance by helically winding metallic foil strip with overlapping or abutting edges. The adjacent edges of the helical turns may be secured to each other in any of several ways, such as by adhesive means, for instance epoxy type adhesive. Alternatively, the adjacent edges of the metal strips may be welded together or may be complimentarily deformed to provide a mechanical interlock.

For the purpose of developing a bond between the metal lining and the thermosetting laminate applied over the lining, the metal foil may be coated with adhesive resins such as epoxy resins having adhesive properties not only with respect to the metal but also with respect to the thermosetting laminate to be applied over the metal. Aluminum foil precoated with epoxy resin is a specific example of a metal foil which may be used in this manner.

For the purpose of effecting bonding between the metal foil liner and the superimposed thermosetting resin laminate, the metal foil may also be etched thereby providing a surface characteristic to which the thermosetting laiminate will effectively adhere.

Metal foil may, if desired, be introduced in the structure of the article being formed as an interlayer, lying within the fiber reinforced thermosetting resin laminate. Moreover a metallic foil may also be applied as a jacket, if desired.

Where a thermoplastic resin is applied as a jacket layer overlying the thermosetting laminate, a protective layer may also be superimposed upon the jacket, in order to avoid undesirable puncturing or abrasion of the jacket. A thin thermosetting layer which may contain a thin fibrous reinforcement may be used as a protective layer, or alternatively a layer of aggregate particles such as those described above may be applied to the outer surface of the thermoplastic resin jacket as a means for protecting the jacket.

In considering the resin materials which are preferably used in accordance with the invention, it is first noted that the thermosetting laminate itself may be made up of any of the commonly used laminating resins. The polyester resins are well suited to this purpose, such as general purpose types made up of styrene monomer-unsaturated alkyd blends, containing a peroxide catalyst.

Certain specially formulated thermosetting resin materials may also be employed to meet specific needs and purposes, for instance the acrylic modified polyester referred to above in order to provide a chemical bond between the laminating resin and an acrylic liner.

With further reference to the thermosetting resins which may be used in accordance with the invention, it is to be noted that although most of the thermosetting resins suitable for this purpose are substantially liquid in the uncured state, in some instances, formulations may be employed in which the uncured constituents are in powder or granule form. In either event it is contempleted that the resin and the fibrous reinforcement be cured in situ on the mandrel. Although most of the thermosetting resin formulations which are suitable require at least some heating to initiate the curing or setting, in which event the controlled termperature chamber indicated at 38 in the drawings would be heated and thus would constitute an oven, nevertheless, certain of the useable thermosetting resin formulations, may be settable at ambient temperatures, in which event the use of a heated oven may not be required although in this case it may in any event be preferred to utilize a chamber in which the temperature is regulated in order to maintain a constant temperature condition.

From the foregoing it will be clear that the use of the term "thermosetting resin" is not intended to be limited to a resin necessarily requiring the application of external heating to effect curing.

In instances where a thermoplastic resin jacket is applied and fused in situ in order to enclose the thermosetting laminate, the exothermic heat developed as a result of curing or setting of the thermosetting resin may be utilized to effect fusion of the thermoplastic resin of the jacket. In some cases the heat for fusion of the jacket may be derived in part from the exothermic heat of the thermosetting resin cure and in part by addition of heat from some external source.

For the liner any of a wide variety of thermoplastic resins may be employed of which typical examples are polyethylene, polypropylene and polyvinyl chloride. Other thermoplastics which may be employed include polymethylmethacrylate and acrylonitrile butadiene styrene.

Still other thermoplastics which may be employed include materials specially formulated to meet special purposes. For instance, a thermoplastic saturated polyester may be employed in order to provide a chemical bond between the lining layer and a thermosetting polyester resin used as the laminating resin.

Still other resin materials may be employed in special ways to accomplish special purposes, one example of which is described herebelow with reference to FIG. 20.

In FIG. 20 there is a diagrammatic representation of the mandrel as formed by the band 21, and alongside this representation of the mandrel there appears a series of numbered arrows, which represent the sequence of treatment steps used in one specific example of a method according to the invention as employed in the building up of a tubular element having a core of fiber reinforced thermosetting laminate layers, and a thermoplastic lining and also a thermoplastic jacket. It will be understood that in this figure the arrows only indicate a sequence of treatment steps and not the location of the steps with respect to the mandrel.

The several steps are briefly identified alongside of each of the several numbered arrows, and this particular example is also described just below in a series of numbered paragraphs corresponding to the numbered arrows.

1. The axially moving mandrel surface is preheated, for instance by a hood such as indicated at 25 in FIG. 1.

2. Particulate high density, high molecular weight, polyethylene resin is applied to the preheated surface as by a feed chute such as shown at 27 in FIG. 1, this resin material having a relatively high softening temperature, for instance of the order of 300° C.

3. Heating is applied as by a heating hood such as indicated at 28 in FIG. 1 in order to insure fusion of the high density polyethylene layer.

4. Cooling air is applied for instance by means of a hood similar to the hood 33 of FIGS. 1 and 2 in order to solidify the fused high density polyethylene layer, but to retain a temperature sufficiently high to effect fusion of low density polyethylene such as referred to in paragraph 5 below.

5. Particulate low density, low molecular weight, polyethylene is applied, for instance a polyethylene having a softening temperature of about 160° C. to about 200° C., which temperature being below that of the underlying high density polyethylene layer will result in fusion of the low density polyethylene into a layer superimposed upon the high density layer.

6. Aggregate particles are applied to the still soft low density polyethylene layer, for instance by a feed mechanism of the kind shown at 31 in FIGS. 1 and 2, and these particles are desirably pressed into the soft low density polyethylene.

7. Cooling is applied in order to solidify the low density polyethylene.

8. Liquid fiber reinforced thermosetting resin material, for instance polyester resin material, is applied, preferably in a plurality of layers such as indicated at 35, 36 and 37 in FIG. 1 and thereby build up the thermosetting laminate.

9. Heating is applied, for instance by an oven such as indicated at 38 in FIG. 1 in order to solidify the laminate.

10. Particulate thermoplastic resin material such as polyethylene, of high or low density, is applied before the laminate has lost its curing temperature, so that the particles will fuse to form a jacket layer.

11. Cooling is applied in order to solidify both the lining layer and the jacket layer prior to delivery of the formed tubular element from the mandrel.

With respect to the specific example shown in FIG. 20 and discussed just above, it may be mentioned that many variations may be made. For example, a thermosetting resin may be utilized in step 8 which is formulated to include a catalyst system providing for setting or curing of the resin at room temperature, in which event the heating of step 9 may not be needed.

In another specific example, a tubular article may be built up by first applying a thermoplastic lining, for instance, polyethylene and then applying a thin fiber reinforced polyester resin layer. These materials may then be subjected to irradiation, for instance by means of an electronic beam accelerator having an output of 3 or 4 Mev., an accelerator of this type being available, for example, from Radiation Dynamics, Inc., Westbury, N.Y., U.S.A. This treatment will accomplish three purposes. First, it will cross link the polyethylene of the lining layer. Second, it will effect curing or setting of the polyester resin. Third, it will develop a bond between the two layers. Other polyester resins may be used in this manner. If desired, additional layers of reinforced thermosetting resin may be applied in order to build up the desired structure or laminate.

By various embodiments of the system and technique according to the present invention, tubular elements of a wide variety of types suitable for many different purposes may readily be produced without extensive handling and other processing disadvantages and difficulties heretofore encountered.

We claim:

1. In the manufacture of tubular fiber reinforced resin elements, the method which comprises applying a tube lining to an axially moving mandrel surface to be advanced axially of the mandrel by said moving surface, applying at least one layer of fiber reinforced thermosetting resin material superimposed upon the tube lining to be advanced axially with the lining, the lining layer being applied by helically winding a preformed thermoplastic tape on the mandrel with the adjacent edges of the helical turns sealed to each other, the thermoplastic tape having a fibrous material adhered to the outer side thereof to provide fibrous interlocking with the thermosetting resin subsequently applied, and curing the thermosetting resin material to effect solidification thereof during axial advancement of the superimposed resin layers with the moving mandrel surface.

2. In the manufacture of tubular fiber reinforced resin elements, the method which comprises applying a tube lining to an axially moving mandrel surface to be advanced axially of the mandrel by said moving surface, applying at least one layer of fiber reinforced thermosetting resin material superimposed upon the tube lining to be advanced axially with the lining, the tube lining being formed in situ on the mandrel surface and comprising a layer of thermoplastic resin material, bonding said layer of thermosetting resin material to the lining layer by applying an interface adhesive coating between the adjoining surfaces of said layers, the adhesive comprising a material having adhesive properties with respect to both the thermoplastic lining and the thermosetting resin material and being applied to the lining after formation thereof on the mandrel, and curing the thermosetting resin material to effect solidification thereof during axial advancement of the superimposed resin layers with the moving mandrel surface.

3. In the manufacture of tubular fiber reinforced resin elements, the method which comprises applying a thermoplastic resin tube lining layer to an axially moving mandrel surface to be advanced axially of the mandrel by said moving surface, the lining layer being applied by delivering to the mandrel surface particulate thermoplastic resin material and heating and fusing the particles to form the layer in situ on the mandrel surface, applying at least one layer of liquid fiber reinforced thermosetting resin material superimposed upon the tube lining to be advanced axially with the lining, bonding adjacent superimposed thermosetting and thermoplastic resin layers to each other by providing recesses in the outer surface of the lining layer to receive liquid thermosetting resin material when applied, and heating the thermosetting resin material to effect solidification thereof during axial advancement of the superimposed resin layers with the moving mandrel surface.

4. In the manufacture of tubular fiber reinforced resin elements, the method which comprises applying a thermoplastic resin tube lining layer to an axially moving mandrel surface to be advanced axially of the mandrel by said moving surface, the lining layer being applied by helically winding on the mandrel surface a plurality of turns of a preformed thermoplastic tape and sealing the adjacent edges of the tape turns to each other before the liquid thermosetting resin material is applied, the preformed tape having a groove preformed in the outer surface thereof thereby providing a helical groove in the lining layer, applying at least one layer of liquid fiber reinforced thermosetting resin material superimposed upon the tube lining to be advanced axially with the lining, thermosetting resin material being received in said helical groove, thereby bonding the adjacent superimposed thermosetting and thermoplastic resin layers to each other, and heating the thermosetting resin material to effect solidification thereof during axial advancement of the superimposed resin layers with the moving mandrel surface.

5. In the manufacture of tubular fiber reinforced resin elements, the method which comprises applying a tube lining to an axially moving mandrel surface to be advanced axially of the mandrel by said moving surface, applying at least one layer of fiber reinforced thermosetting resin material superimposed upon the tube lining to be advanced axially with the lining, heating the thermosetting resin material to effect solidification thereof during axial advancement of the superimposed layers with the moving mandrel surface, and after the heating of the thermosetting resin material but while the tubular element is being advanced axially with the mandrel surface applying a jacket of thermoplastic resin material by helically winding a preformed thermoplastic resin tape on the thermosetting resin material.

6. A method as defined in claim 5 in which the thermoplastic resin tape is applied after solidification of the thermosetting resin material.

7. In the manufacture of tubular fiber reinforced resin elements, the method which comprises applying a tube lining to an axially moving mandrel surface to be advanced axially of the mandrel by said moving surface, applying at least one layer of fiber reinforced thermosetting resin material superimposed upon the tube lining to be advanced axially with the lining, applying a thermoplastic resin jacket layer to the thermosetting resin material, introducing bonding means between the jacket layer and the thermosetting resin material, the bonding means being introduced by providing mechanically interlocking means between the adjacent surface portions of the jacket layer and the thermosetting resin material, the interlocking means being applied by helically winding a preformed thermoplastic tape carrying the interlocking means on its inner surface onto the thermosetting resin layer, and curing the jacketed tubular element to solidify the thermosetting resin material.

8. In the manufacture of tubular fiber reinforced resin elements, the method which comprises applying a metal tube lining layer to an axially moving mandrel surface to be advanced axially by said moving surface, applying at least one layer of fiber reinforced thermosetting resin material superimposed upon the tube lining to be advanced axially with the lining, introducing bonding means between the lining layer and the thermosetting resin material by providing an etched surface on the metal layer, the thermosetting resin material being applied in liquid form to the etched surface of the metal lining layer, and curing the thermosetting resin material to effect solidification thereof in situ on the mandrel with the bonding means between the thermosetting material and the lining layer.

9. In the manufacture of tubular fiber reinforced resin elements, the method which comprises applying a metal tube lining layer to an axially moving mandrel surface to be advanced axially by said moving surface, applying at least one layer of fiber reinforced thermosetting resin material superimposed upon the tube lining to be advanced axially with the lining, introducing bonding means between the lining layer and the thermosetting resin material by providing an adherent resin coating on the surface of the metal layer, and curing the thermosetting resin material to effect solidification thereof in situ on the mandrel with the bonding means between the thermosetting material and the lining layer.

10. In the manufacture of tubular fiber reinforced resin elements, the method which comprises applying a polyethylene thermoplastic tube lining layer to an axially moving mandrel surface to be advanced axially of the mandrel by said moving surface, at a station downstream of the point of application of the lining layer, applying a layer of liquid fiber reinforced thermosetting resin material superimposed upon the tube lining to be advance axially with the lining, and at a station downstream of the station where the thermosetting resin material is applied concurrently curing the thermosetting resin material, effecting cross linking of the polyethelene and effecting bonding of the resin layers to each other by subjecting the superimposed resin layers to irradiation.

11. In the manufacture of tubular fiber reinforced resin elements on a rotating and axially moving cylindrical mandrel surface, the method which comprises delivering continuous lengths of elongated reinforcement fibers to a station located on the surface of the mandrel at a predetermined circumferential position to be helically wound thereon and delivered from an end of the mandrel by the rotative and axial movement of the mandrel surface, in a zone circumferentially in advance of said station progressively establishing a layer of resin material in a soft condition and into which the reinforcement fibers are delivered and embedded, and in a region of the mandrel axially downstream of said zone effecting solidification of the resin material while it is carried on the mandrel surface prior to delivery from the end of mandrel.

12. In the manufacture of tubular fiber reinforced resin elements, the method which comprises applying multiple layers of a laminate to an axially moving mandrel surface to be advanced axially by said moving surface, the laminate including a metal layer and at least one layer of fiber reinforced thermosetting resin material superimposed upon the metal layer, introducing bonding means between the metal layer and the thermosetting resin material by providing an etched surface on the metal layer, the thermosetting resin material being applied in liquid form to the etched surface of the metal layer, and curing the thermosetting resin material to effect solidification thereof in situ on the mandrel with the bonding means between the thermosetting material and the metal layer.

13. In the manufacture of tubular fiber reinforced resin elements, the method which comprises applying multiple layers of a laminate to an axially moving mandrel surface to be advanced axially by said moving surface, the laminate including a metal layer and at least one layer of fiber reinforced thermosetting resin material superimposed upon the metal layer, introducing bonding means between the metal layer and the thermosetting resin material by providing an adherent resin coating on the surface of the metal layer, and curing the thermosetting resin material to effect solidification thereof in situ on the mandrel with the bonding means between the thermosetting material and the metal layer.

14. In the manufacture of tubular fiber reinforced resin elements, the method which comprises applying multiple layers of a laminate to an axially moving mandrel surface to be advanced axially by said moving surface, the laminate including at least three layers, two of which are layers of fiber reinforced thermosetting resin material and a third layer of which is a metal layer interposed between the two resin layers, introducing bonding means between the metal layer and the superimposed thermosetting resin material by providing an adherent resin coating on the surface of the metal layer, and curing the thermosetting resin material of the resin layers to effect solidification thereof in situ on the mandrel with the bonding means between the thermosetting material and the metal layer.

* * * * *